United States Patent [19]

Berg

[11] Patent Number: 4,550,928
[45] Date of Patent: Nov. 5, 1985

[54] FRONT AIR SWINGAWAY

[75] Inventor: Arthur A. Berg, Northbrook, Ill.
[73] Assignee: Sloan Valve Company, Franklin Park, Ill.
[21] Appl. No.: 621,214
[22] Filed: Jun. 15, 1984
[51] Int. Cl.[4] .............................................. B60D 7/04
[52] U.S. Cl. ...................................... 280/421; 285/74
[58] Field of Search ................... 280/421, 420; 248/75; 285/1, 74; 137/351

[56] References Cited

U.S. PATENT DOCUMENTS 3,279,827 10/1966 Brown ................................. 280/421
3,388,927 6/1968 Von Grünberg .................... 280/421
4,366,965 1/1983 Rhodes ............................... 280/421

Primary Examiner—Joseph F. Peters, Jr.
Assistant Examiner—Donn McGiehan
Attorney, Agent, or Firm—Kinzer, Plyer, Dorn & McEachran

[57] ABSTRACT

This is concerned with a front air swingaway which is a device for connecting the air supply between a tractor-trailer combination where the air source is on the tractor. The swingaway is constructed to be mounted on the front of the trailer and projects forwardly when in use but is automatically folded back against the front of the trailer when not in use, meaning when it is not connected to a gladhand.

10 Claims, 7 Drawing Figures

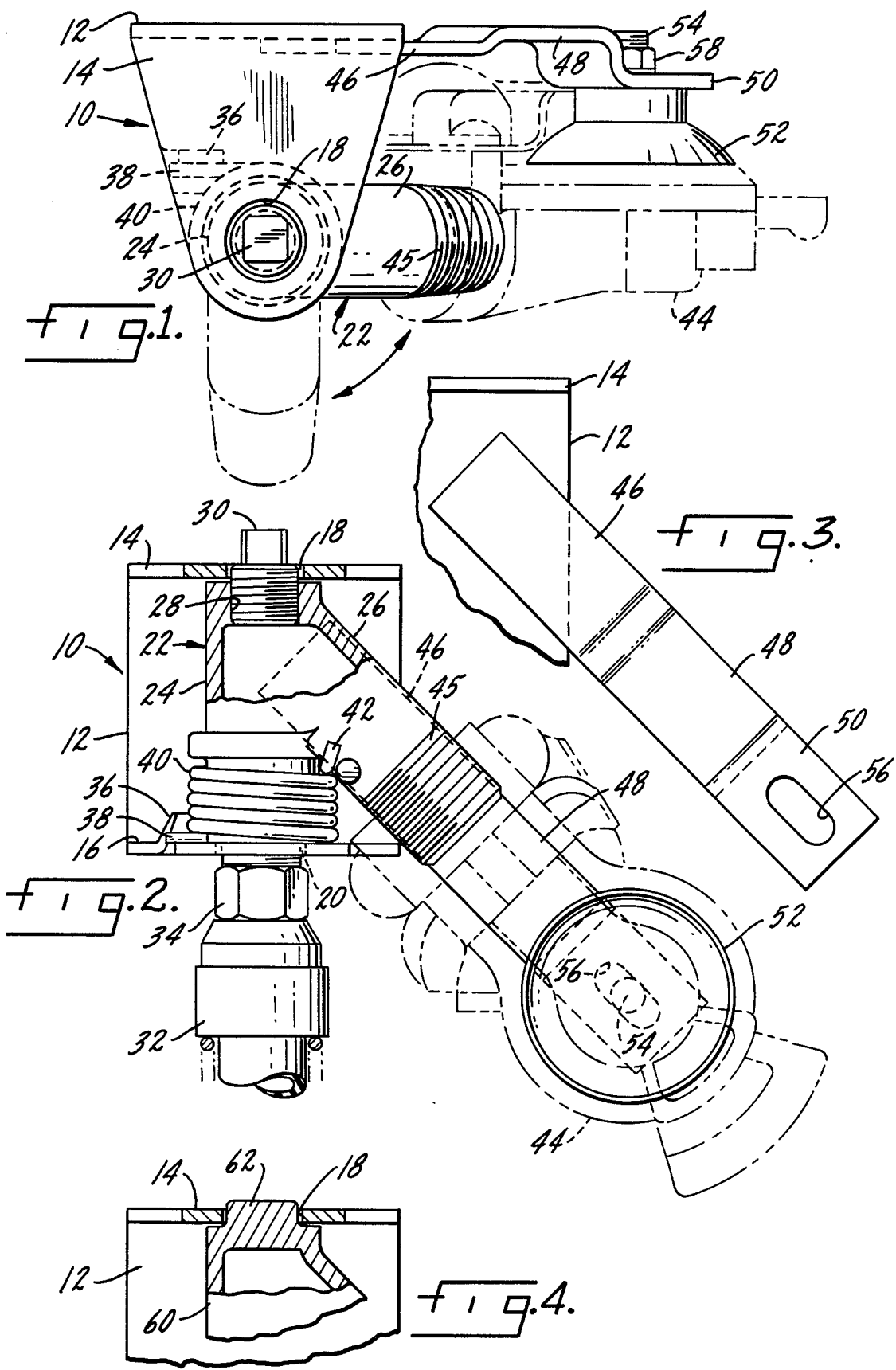

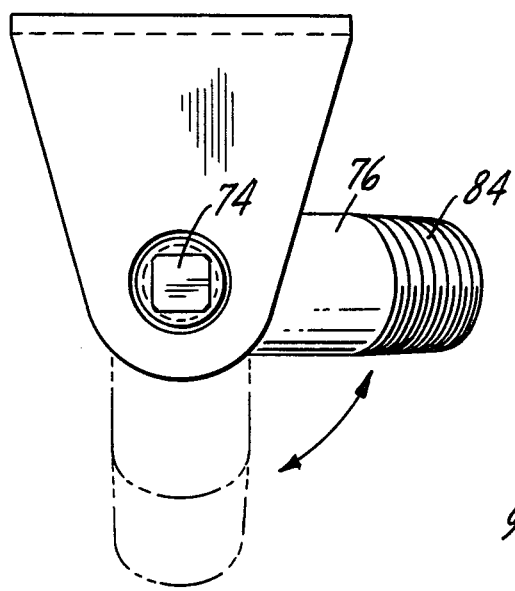
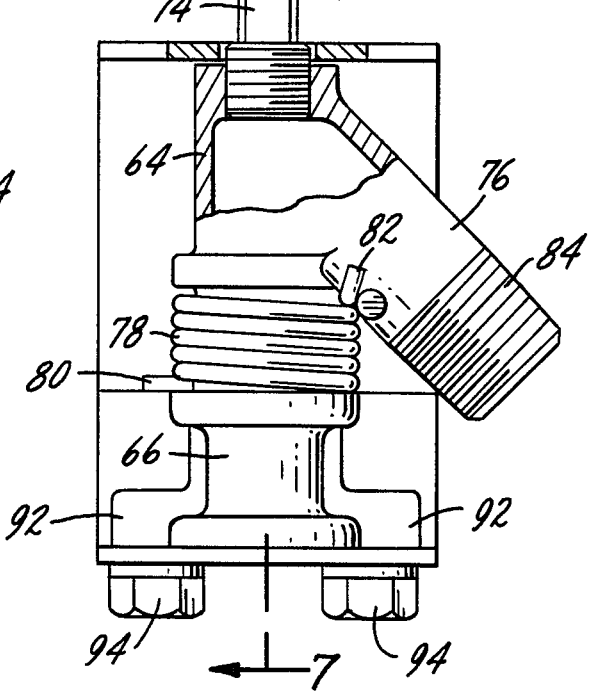
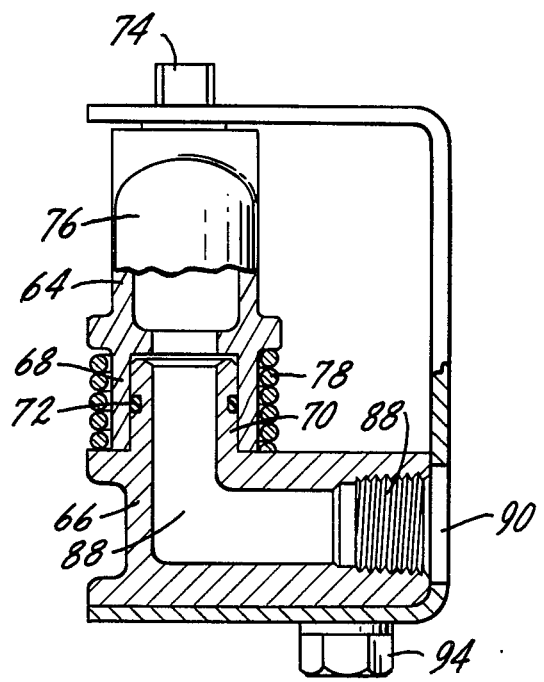

FRONT AIR SWINGAWAY

SUMMARY OF THE INVENTION

This is concerned with a front air swingaway connection to be mounted on the front of a trailer in a tractor-trailer combination for connecting the air supply where the air source is on the tractor and the air is to be used on the trailer. Normally, such connection is made by a gladhand to a mounting on the front of the trailer with appropriate flexible hoses and swivel joints.

A primary object is a front air swingaway for use on the front of a trailer to ensure that the air connection on the front of the trailer, when not in use, will not project forwardly and possibly be subject to damage.

Another object is a front air swingaway of the above type which causes the connection on the front of the trailer to automatically fold back in against the front of the trailer when not in use.

Another object is a front air swingaway which may be made of standard components.

Another object may be a shock absorber arrangement which prevents the swingaway from damaging or banging against the front of the trailer.

Another object of the shock absorber is to cover the exposed face of the trailer gladhand so that dirt, insects or other debris cannot either enter the air lines or be deposited on the rubber sealing face.

Another object is a front air swingaway which ensures proper air connection and avoids damage when not in use.

Other objects will appear from time to time in the ensuing specification and drawings.

BRIEF DESCRIPTION OF THE DRAWINGS

FIG. 1 is a top view of the front air swingaway illustrating an arrangement by which the air supplied to the trailer is done through an exterior front hose mounted arrangement.

FIG. 2 is a front view of FIG. 1, partially in section.

FIG. 3 is a partial front view showing a strap mounted on the bracket.

FIG. 4 is a partial view similar to FIG. 2 of a variant form;

FIG. 5 is a top view of an alternate form by which the air supplied to the trailer will be through a fitting connected in back of the swingaway;

FIG. 6 is a front view of FIG. 5 partially in section; and

FIG. 7 is a section along line 7—7 of FIG. 6.

DESCRIPTION OF THE PREFERRED EMBODIMENT

In FIGS. 1 and 2, a front air swingaway is shown which includes a bracket 10 which is made up of a generally flat upright 12 with forwardly disposed projections 14 and 16 at top and bottom. The top projection 14 has an opening 18 as does the bottom projection at 20.

A body member 22 which is in the nature of a standard Y fitting is positioned in the bracket and is made up of a central generally upright portion 24 and an integral arm 26 formed thereon and disposed outwardly and downwardly at roughly a 45° angle from the vertical although it could be otherwise. The inside of the body member 22 is hollow to provide for air flow. Such a standard casting has a threaded opening 28 at the top and a similar threaded opening at the bottom (not shown). A pipe plug 30 is threaded into the top opening to close it and also projects through the opening 18 in the top projection of the bracket so that it functions as a pivot.

A flexible hose 32 which may have a standard swivel connection 34 at the upper end thereof is adapted to project through the bottom opening 20 in the bracket and into the threaded opening in the bottom of the casting 22.

The lower projection or arm 16 on the bracket is notched and bent into a riser or abutment 36 which functions as a dead end for one end 38 of a coil spring 40 which is disposed about the lower end of the fitting 22. The other end 42 is around the arm 26 of the fitting.

The result is that the fitting 22 is pivoted in the bracket and is biased counterclockwise in FIG. 1. With the flat upright 12 of the bracket mounted on the front of a trailer, the arm 26 of the fitting will tend to be swung to the full line position in FIG. 1 where it will be folded back out of the way rather than projecting forwardly as in the dotted line position of FIG. 1.

A conventional gladhand 44 is shown in dotted lines in FIGS. 1 and 2 mounted on the threaded end 45 of the fittings arm 26. It will be understood that the gladhand serves as the connection to a suitable flexible hose which also has a gladhand mounted on it and extends forward to the tractor and connects to the air source. The gladhands serve as a quick disconnect. The other flexible hose 32 in FIG. 1 extends to whatever air operated devices exist on the trailer.

As shown in FIGS. 1 and 3, a strap 46 may be welded or otherwise suitably secured to the upright 12 of the bracket and extends away and down with an offset 48 to a flat outer portion 50 which adjustably supports a rubber cup 52 which is mounted by a bolt or stud 54 which is imbedded in the rubber suction cup and extends through an elongated slot 56 in the bracket or strap and is held in place by a suitable nut 58 or the like. Depending upon the size and type of gladhand that is used, when it is swung back against the side of the trailer's front surface, it may well contact at various points due to the tolerances between the threads 45 on the arm 26 and the threads of the gladhand. The cup 52 serves a dual function as a shock absorber and as a cover to protect the face and opening of the gladhand. It may be adjusted within slot 56 so that it accurately lines up with the gladhand.

In FIG. 4 an alternate form is shown in which the casting 60, instead of being fitted with a pipe plug, as in FIG. 2, has an integral riser 62 which extends through the opening in the bracket's top projection and functions as a trunnion when the casting is being pivoted either in or out.

In FIGS. 5-7, an alternate form is shown in which, in a sense, the casting is made in two parts, an upper part 64 which is mounted on and telescoped to a lower part 66 which is in the nature of a base block. The upper part or casting 64 is similar to the Y shaped casting in FIGS. 1 and 2 except that the lower portion 68 has been reamed out, instead of having internal thread and is fitted over a riser 70 on the body block and is sealed thereto by a conventional O ring 72 or the like providing for air flow without leakage between the two parts. As before the top of casting 64 has a pipe plug 74 which extends up through the bracket and serves as a pivot so that the arm 76 may pivot between the two positions shown in FIG. 5. A coil spring 78 is disposed about the telescopic parts 68, 70 and is dead ended on the body block at one end, as at 80, and on the arm 76 of the upper casting as at 82 so that the upper casting 64 will be pivoted or biased counterclockwise at all times in FIG. 5.

A gladhand has not been shown mounted on the threaded end 84 of the outlet arm but it should be understood that this may be the same as shown and described in connection with FIGS. 1 and 2. Neither has the rubber cup 52 arrangement been shown on FIGS. 5 or 6, and this may be the same as shown and described in FIGS. 1 and 2.

The air passage 86 through the body block turns 90° and opens through female threads 88 in the rear portion thereof with a suitable opening 90 in the upright of the bracket so that an air connection can be made directly through the side wall of the front of the trailer.

One means of securing the body block 66 to the bracket is to provide flanges 92 on each side thereof so that screws 94 may extend through the bottom of the bracket and securely mount the body block therein.

The use, operation and function of the invention are as follows:

The device is simple, reliable and easy to mount on the front of a trailer. When not in use, the connection will be swung back against the front wall of the trailer where it will not be damaged or knocked off. When in use, it will easily and freely pivot to a forward position under the urging of the gladhand and the connecting hose. If the hose is connected to the bottom by a swivel, there will be no torque or twist in the hose itself and thus its life will be prolonged.

The body element itself may be a standard Y casting which is inexpensive and a standard item.

When the gladhand is disconnected and the end released, the spring will swing the extending air connection back against the front of the trailer. If the bumper or shock absorber or rubber cup is used, it helps prevent any damage to the front of the trailer and also reduces or eliminates noise. The rubber cup also covers the sealing face of the gladhand, thus protecting the seal from dirt or contamination and also protects the air passage opening from having dirt, insects or any other form of contamination deposited in the gladhand opening and subsequently being blown into the pipe of the air brake system. Since the gladhand will vary where it tightens up due to the tolerances in the pipe thread, it is very desirable to be able to adjust the rubber bumper or suction cup in or out so that accurate alignment can be acquired.

While I've shown and described the preferred form and several variations of the invention, it should be understood that suitable additional modifications, changes, substitutions and alterations may be made without departing from the invention's fundamental theme.

I claim:

1. In a front air swingaway for connecting an air supply to the front of a trailer in a tractor-trailer combination, a bracket constructed and arranged to be mounted on the front of the trailer, a body member pivotally mounted on the bracket about a vertical axis and having two connections, one for connection to the source of air supply on the trailer, and the other for connection to the trailer's air system, the other connection extending beyond the periphery of the bracket and being movable when the body member is pivoted on the bracket, and a spring on the bracket for biasing the body member about its pivot so that the other connection extending beyond the periphery of the bracket will be releasably urged against the front of the trailer when it is not in use.

2. The structure of claim 1 further characterized in that the bracket has a generally flat upright with forward projections top and bottom with an opening in each in spaced relation to the upright, the openings serving as pivots for the body member.

3. The structure of claim 2 in which the body member is a Y casting with an upright central portion that pivots at each end in the openings in the bracket's forward projections, and an integral outlet arm extending out and down from the central portion beyond the periphery of the bracket.

4. The structure of claim 3 further characterized by and including openings at each end of the upright central portion of the Y casting, the bottom opening being constructed and arranged for connection to a hose assembly for the source of air supply, and the top opening having a pipe plug fitted therein and in the opening in the bracket's top projection and serving as a pivot.

5. The structure of claim 1 further characterized by and including an arm extending laterally from the side of the bracket, and a shock absorber on the arm aligned with a gladhand mounted on the other connection when it is biased against the side of the trailer.

6. The structure of claim 5 further characterized by and including an adjustable mounting for the shock absorber on the arm so that the shock absorber may be aligned with the gladhand.

7. The structure of claim 1 further characterized in that the bracket has a generally flat upright with forward projections top and bottom with openings therein in spaced relation to the upright which serve as a pivot for the body member, the body member being a Y casting with an upright central portion with pivots at each end thereof, and an integral outlet arm extending out and down therefrom beyond the periphery of the bracket, the spring being in the form of a coil spring disposed around the upright central portion of the Y casting below the integral outlet arm.

8. The structure of claim 1 further characterized in that the bracket has a generally flat upright with forward projections top and bottom with openings therein in spaced relation to the upright which serve as pivots for the body member, the body member being a Y casting with an upright central portion with pivots at each end thereof, and an integral outlet arm extending out and down therefrom beyond the periphery of the bracket, and further including a base block under and supporting the body member, and an angled passage in the base block opening into the bottom of the body member at one end and through the generally flat upright of the bracket at the other end for connection to the inside of the trailer, the body member being pivotally mounted on the base block.

9. The structure of claim 8 further characterized by and including an arm extending laterally from the side of the bracket, and a shock absorber on the arm aligned with a gladhand mounted on the other connection when it is biased against the side of the trailer.

10. The structure of claim 9 further characterized by and including an adjustable mounting for the shock absorber on the arm so that the shock absorber may be aligned with the gladhand.

* * * * *